United States Patent [19]

Helliot et al.

[11] Patent Number: 5,002,472

[45] Date of Patent: Mar. 26, 1991

[54] PROFILES OF SCREW-TYPE ROTORS FOR ROTARY MACHINES CONVEYING A GASEOUS FLUID

[75] Inventors: Bernard R. A. G. Helliot, Lyon; Patrick Baudrier, Sens, both of France

[73] Assignee: Societe Anonyme: Baudot-Hardoll S.A., Sens, France

[21] Appl. No.: 264,958

[22] PCT Filed: Jan. 5, 1988

[86] PCT No.: PCT/FR88/00005

§ 371 Date: Nov. 1, 1988

§ 102(e) Date: Nov. 1, 1988

[87] PCT Pub. No.: WO88/05118

PCT Pub. Date: Jul. 14, 1988

[30] Foreign Application Priority Data

Jan. 6, 1987 [FR] France .................. 87 00192

[51] Int. Cl.$^5$ ........................................... F04C 18/16
[52] U.S. Cl. ............................................. 418/201.3
[58] Field of Search ............................ 418/197, 201 B

[56] References Cited

U.S. PATENT DOCUMENTS 3,166,238 1/1965 White et al. .................. 418/201 B

FOREIGN PATENT DOCUMENTS

| | | |
|---|---|---|
| 0080585 | 10/1982 | European Pat. Off. . |
| 2904332 | 8/1980 | Fed. Rep. of Germany . |
| 267186 | 6/1950 | Switzerland . |
| 573600 | 9/1977 | U.S.S.R. .................. 418/201 B |
| 1300867 | 12/1972 | United Kingdom . |
| 1342287 | 1/1974 | United Kingdom ......... 418/201 B |

OTHER PUBLICATIONS

*Traite Theorique et Pratique des Engrenages*, par G. Henriot, 6'édition, pp. 11 and 12.

*Primary Examiner*—John J. Vrablik
*Attorney, Agent, or Firm*—Bacon & Thomas

[57] ABSTRACT

The present invention provides an improved rotary machine of the type having male and female rotors with complementary intermeshing helical teeth. The improvement relates to the profile of the teeth, particularly the teeth of the male rotor, so that there is a reduction of the phenomenon of wedging of the sealing, lubricating or cooling liquid molecules and a reduction of the wedging of the molecules of gaseous fluid between the bores and apices of the teeth. The improved profile of the teeth and the resulting reduction of the wedging phenomenon prevents a loss of power which is typical in the prior art screw-type rotary machines.

6 Claims, 5 Drawing Sheets

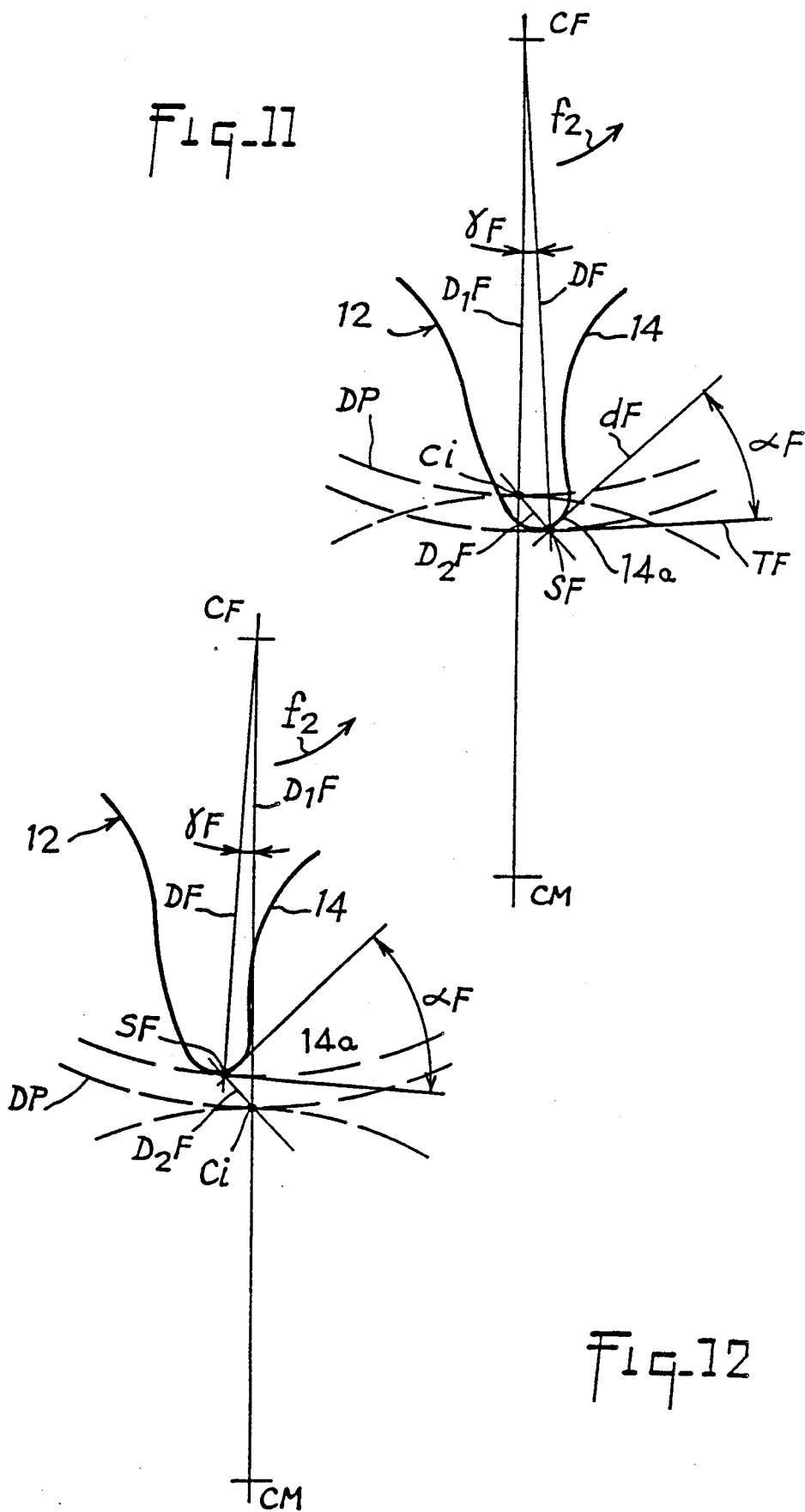

5,002,472

PROFILES OF SCREW-TYPE ROTORS FOR ROTARY MACHINES CONVEYING A GASEOUS FLUID

TECHNICAL FIELD

The present invention relates to rotary machines comprising a stator housing two rotors, respectively male and female, driven in opposite rotations in either controlled or non-controlled manner. The object of the invention relates to the technical field of machines of the aforesaid type of which the rotors have complementary helical teeth creating, by their intermeshing, cells of variable volume, which, by developing along a direction parallel to the rotors rotation axis, set up a flow of gaseous fluid between an admission or induction orifice and an expelling orifice.

The object of the invention concerns machines of the aforesaid type working as compressors or vacuum-pumps.

PRIOR ART TECHNIQUE

In the machines of the aforesaid type, the rotation of the rotors inside their housings, when it is caused by the controlled rotation of one rotor driving the other in rotation, is performed with interposition of a liquid, generally oil, then achieving sealing between the teeth of the rotors and the housings of the stator, lubrication between rotor and stator, and cooling of the compressed gaseous fluid.

The screw-type rotors, known from application GB-A-1 342 287, have tooth tips in wedge form. With this particular construction, the presence of the sealing, lubricating and cooling liquid causes an important loss of power, due to the phenomenon whereby the liquid molecules are wedged between the tip of the teeth of the male and female rotors and the housings of the stator containing them. Said wedging phenomenon generates high pressures exerting radial forces which are harmful to the rotors and to the bearings supporting them. Said radial forces are amplified, on the one hand, by the centrifuging of the liquid in concentration near the top of the teeth, due to the high rotation of the rotors, and on the other hand, by the flowing of said liquid from the delivery plane toward the induction plane, caused by the difference of pressure between said two planes.

It is to be noted that a similar phenomenon occurs also in cases where the rotors are driven in gear-synchronized controlled rotations. In such cases, there is no lubricant fluid provided. The formation is however noted, for each tip of the teeth, of a wedge of high pressure air which is responsible for overheating and loss of power.

It is the object of the invention to propose new profiles for male and female rotors, seeking to reduce, altogether, the importance and extent of phenomenon of wedging of the molecules either of the sealing, lubricating or cooling liquid of the gaseous fluid, or of said gaseous fluid.

SUMMARY OF THE INVENTION

In order to reach the aforesaid object, the invention proposes cutting profiles, characterized in that they involve, at least for the teeth of the male rotor, an apex: offset by an angle in the direction of rotation,
a chamfer making an angle open in the direction of rotation and defined between, on the one hand, a tangent to the apex, perpendicular to a straight line joining said apex to the center of rotation of the male rotor and, on the other hand, a straight line tangent to the apex and perpendicular to a straight line joining said apex to the instantaneous center of rotation.

Various other characteristics will emerge from the following description with reference to the accompanying drawings which show, by way of example and non-restrictively, embodiments of the object of the invention.

BRIEF DESCRIPTION OF THE DRAWINGS

FIGS. 11 and 12 are cross-sections showing two variants of embodiment of one of the means of the invention.

DESCRIPTION OF PREFERRED EMBODIMENT

Figure 1:
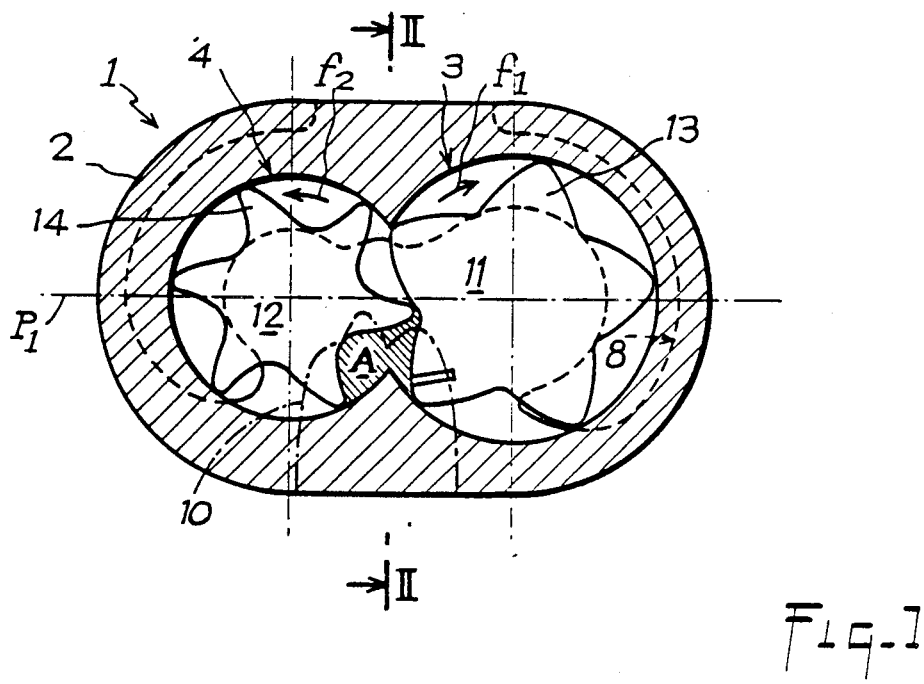
FIG. 1 is a cross-section of a rotary machine according to the invention.
Figure 2:
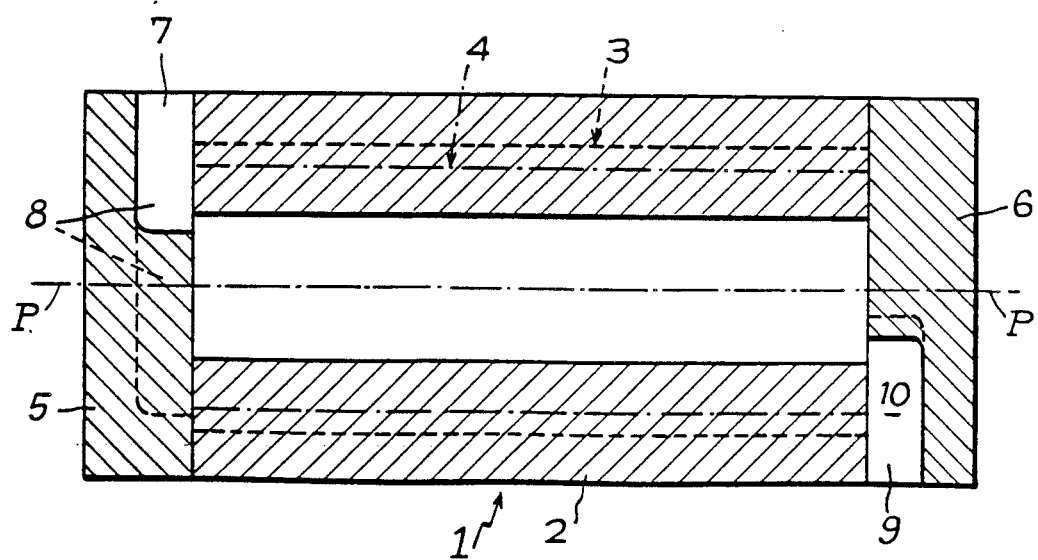
FIG. 2 is an elevational view of an axial section taken substantially along line II—II of FIG. 1.

FIGS. 1 and 2 show a rotary machine 1 comprising a body or stator 2 defining two bores 3 and 4 which have parallel and secant axes. The stator 2 is closed laterally by two plates 5 and 6 defining respectively, an induction orifice 7 which communicates with a vestibule 8 in communication with the upper part of the bores 3 and 4, and a delivery orifice 9 which communicates with a delivery chamber 10 connected with the lower part of the bores 3 and 4. The chambers 7 and 9 have their openings situated on either side of a plane P passing through the axes of the rotors.

Plates 5 and 6 are provided with bearings, although this is not shown in the drawings, for supporting two rotors, respectively male 11 and female 12, housed in the bores 3 and 4. One of the rotors, such as for example rotor 11, is called driving rotor, because of its being driven in rotation in the direction of arrow $f_1$ by a driving member not shown. The female rotor 12 is called driven rotor, on account of the fact that its rotation, according to $f_2$, is caused by that of rotor 11.

In known manner, rotors 11 and 12 are provided with complementary helical teeth 13 and 14, intermeshing successively, during the rotations in the direction of arrows $f_1$ and $f_2$, in the intersection of bores 3 and 4. In conventional manner, teeth 13 and 14 are defined in cross-section perpendicular to the axis of rotation, by profiles comprising, for each tooth, several curve segments joined one to the other in succession while being determined in such a way that, when two complementary teeth intermesh in the intersection of the bores 3 and 4, the rotations, according to arrows $f_1$ and $f_2$, create, in the transversal induction plane, a cell A of progressively decreasing volume, which, because of the helical form of the teeth, evolves according to an axial displacement from the transversal induction plane toward the opposite transversal plane corresponding to the delivery plate 6.

Such a working principle, which is due to the geometry of the teeth, is not the object of the invention and is not described in more detail hereinafter, given that knowledge of this principle and of the means for carrying it into effect are accessible to any one skilled in the art, from many available publications.

As recalled hereinabove, the rotation of rotors 11 and 12 causes the creation of a film sealing, lubricating and cooling liquid over the whole internal surface of the bores 3 and 4. In order to eliminate the phenomenon of wedging of the molecules of this film, or of the molecules of the conveyed gaseous fluid, between the bores and the apices of the teeth 13 and 14, the invention proposes to confer, at least to the teeth 13, a cross-sectional profile as described hereafter.

Figure 3:
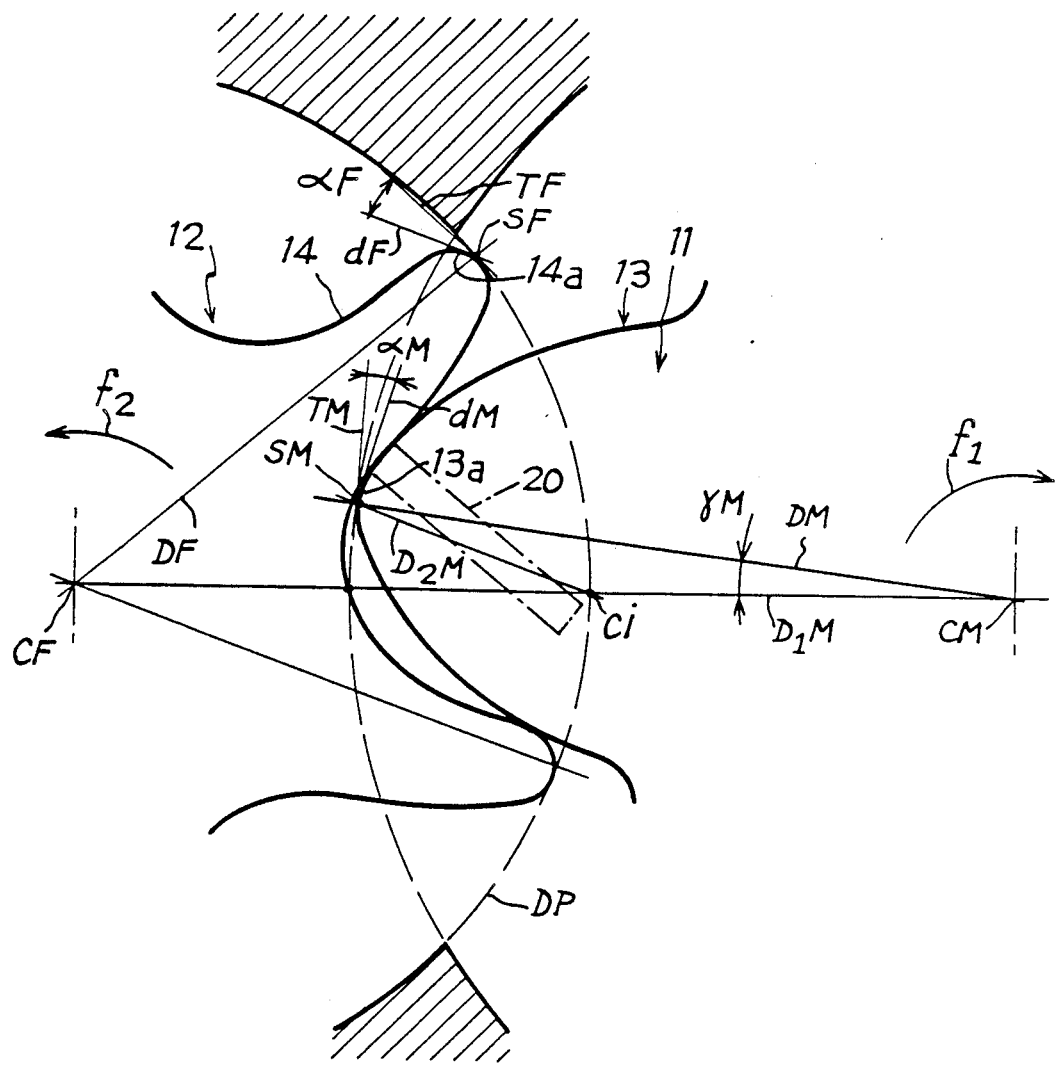
FIG. 3 is a cross-section showing, on a larger scale, the embodiment of the profiles according to the invention.
Figure 6:
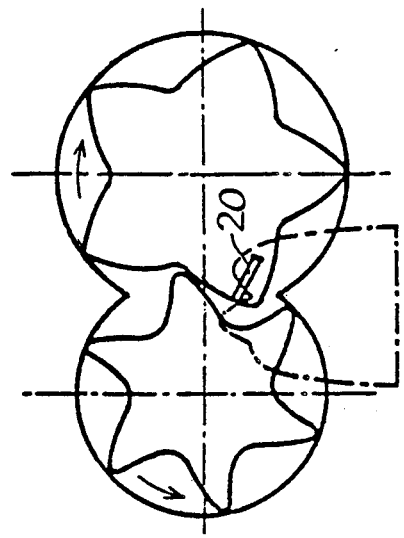
FIGS. 4 to 10 are diagrammatical views, similar to FIG. 1, illustrating various characteristic phases of operation of the object of the invention.
Figure 7:
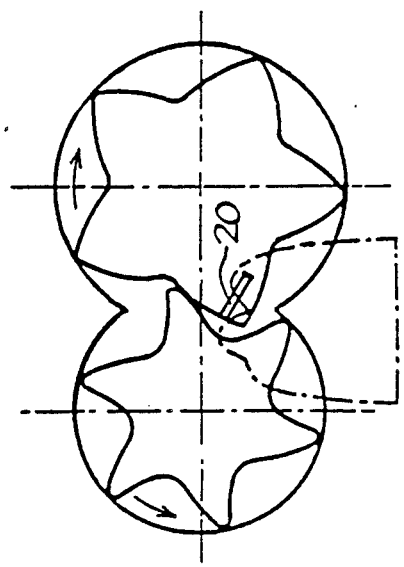
Figure 5:
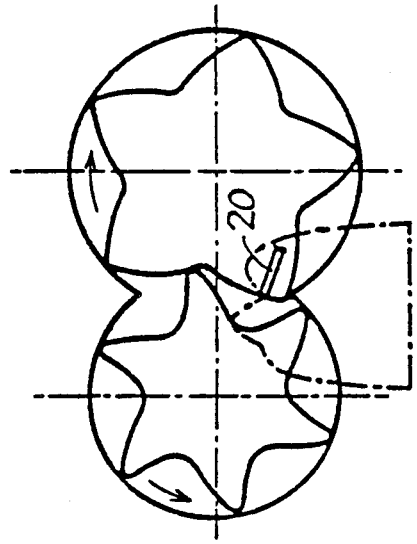
Figure 4:
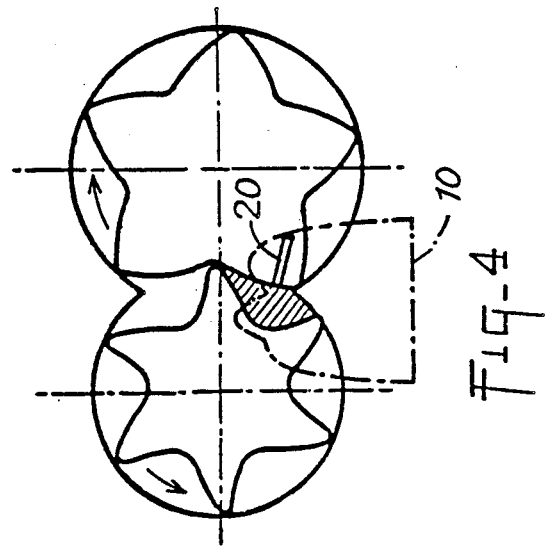
Figure 10:
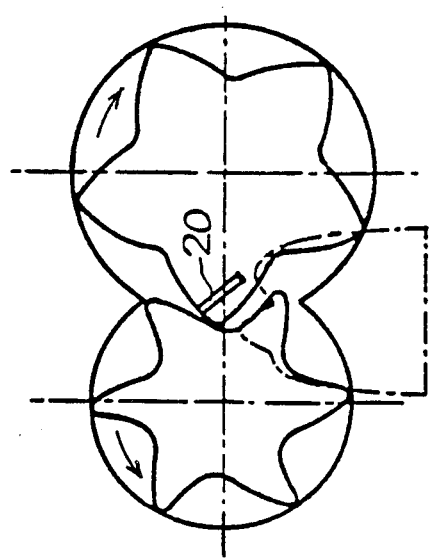
Figure 9:
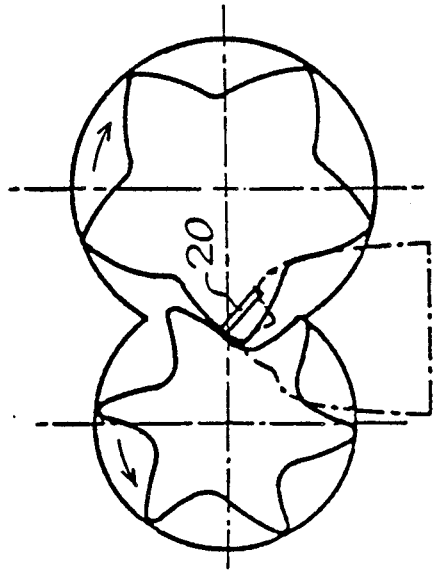
Figure 8:
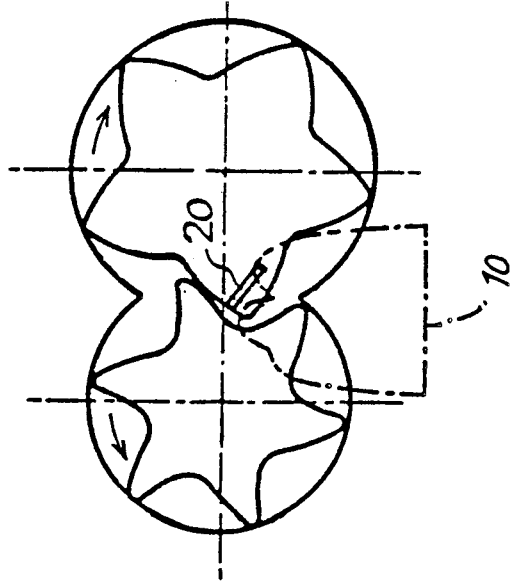

FIG. 3 shows that each tooth 13 of the rotor 11 is designed so as to comprise an apex SM offset in the direction of rotation of an angular value $\gamma M$ comprised between, on the one hand, a straight line DM joining the center of rotation CM of the male rotor 11 to the apex SM and, on the other hand, the straight line $D_1M$ joining the center CM to the center CF of the female rotor 12. The angle $\gamma M$ can be between 1° and 30° and preferably has a value equal to 7°.

The apex SM is joined to the downstream profile segment according to rotatin direction $f_1$ by a chamfer 13a materialized by a straight line dM tangent to the apex SM and perpendicular to a straight line $D_2M$ joining the apex SM to the instantaneous center of rotation CI. The straight line dM forms an angle $\alpha M$ with the tangent TM passing through the apex SM and perpendicular to straight line DM. The angle $\alpha M$ can be between 1° and 36° and its value determines, by construction, the value of angle $\gamma M$, the distance between the axes of the bores 3 and 4 and their diameters, being given values.

FIG. 3 also shows that each tooth 14 of the female rotor can also be designed so as to have, in cross-section, a profile such that a chamfer 14a is created from apex SF, which chamfer is inclined in the direction of rotation $f_2$. Said chamfer 14a is produced in such a way that the straight line dF which materializes it forms an angle $\alpha F$ with the tangent TF passing through apex SF and perpendicular to the straight line DF joining the apex to the center of rotation CF of the female rotor 12. The angle $\alpha F$, open in the direction of rotation $f_2$, can be between 1° and 90° and preferably has a value ranging between 10° and 30°.

An examination of FIG. 3 reveals that the chamfers 13a and 14a, opening according to angles $\alpha M$ and $\alpha F$, are responsible for the definition with respect to the peripheral surfaces of bores 3 and 4, of wedge-shaped volumes. During the rotation in the directions of arrows $f_1$ and $f_2$, the role of said chamfers is to force back the sealing, lubricating and cooling liquid or even, the conveyed gas, without subjecting it to a laminating and wedging effect, as this occurs when the apices SM and SF are tangentially joined.

Shaping of the profiles, as indicated hereinabove, permits:

- a reduction of the frictions at the apices of the teeth, due to the fact that the sealing, lubricating and cooling liquid is no longer confined between the apices of the rotor teeth and the bores of the stator,
- a reduction of leakages of the forced back liquid or compressed gas toward the induction, due to the fact that said liquid is forced back by the chamfers instead of being absorbed or swallowed by the gradual shape of the tangentially joined profiles,
- a reduction of the areas undergoing frictions, due to the reduction of the mass of liquid driven back toward the induction,
- an improvement of the mechanical performance and of the thermal efficiency by simultaneous reduction of the stray sources of overheating caused by heating and by the leaks of liquid and gas (or of gas alone), which actually reduces the quantity of heat to be expelled by the cooling fluid.

In the example of embodiment of the teeth 13 illustrated in FIG. 3, the shape conferred to said teeth alters the design of the delivery chamber 10 which coincides with the location of the contact points of the male and female rotors in the corresponding transverse plane. To achieve total draining out of variable-volume cell A, it is advantageous, as illustrated in FIG. 3, to provide on the transversal face of the male rotor 11, corresponding to the plane of the delivery chamber 10 and for each one of the teeth 13, a communication 20 between the profile segment preceding chamfer 13a in the direction of rotation of the rotor and a zone adjacent the instantaneous center of rotation CI. Such a communication may be formed by a recess provided in the transversal face or else by a duct formed in set-off relationship with respect to said face, from the tooth profile, and reaching into said tooth through a communicating hole.

Communication 20 makes it possible, as can be seen on examining FIGS. 4 to 10, to keep up a communication between the delivery cell A defined between two intermeshing teeth, and the delivery chamber 10, and this throughout the end of the delivery action.

The object of the invention is described in relation with rotors having teeth with asymmetrical profile. But it is understood that the dispositions of the invention can be used with symmetrical profiles.

The various advantages afforded by the object of the invention are all re-grouped in the case of constructions in which the rotors are both driven in synchronized controlled rotations by two pinions external to the bores of the male and female rotors and respectively made fast with one rotor. In such a case, the presence of the sealing, lubricating and cooling liquid is not necessary, and the advantage then afforded by the disposition according to the invention is to the reduction of gaseous fluid leaks between the delivery phase and the induction phase, as well as the reduction of overheating of such a fluid.

FIG. 11 shows a variant embodiment whereby the apices SF of the teeth 14 of the female rotor 12 are situated beyond the working diameter DP of said rotor. In such a case, the apex SF of each tooth is offset, in the direction of rotation $f_2$, of a positive angular value $\gamma F$. The apex SF further comprises, as previously indicated, a chamfer 14a which is materialized by a straight line dF passing through the apex SF and perpendicular to a straight line $D_2F$ joining the apex SF to the instantaneous center of rotation CI. The straight line dF forms, with the tangent TF to the apex SF, perpendicular to a straight line DF joining the apex SF to the center CF, an angle $\gamma F$.

FIG. 12 shows another variant corresponding to an embodiment whereby each apex SF is situated within the working diameter DP. In such a case, the angle $\gamma F$ is negative with respect to the direction of rotation.

In the two examples illustrated in FIGS. 11 and 12, $\gamma M$ is dependent both on the positive or negative difference between the radius of the tooth apex and the working radius of the tooth 14 and of angle F which may be between 1° and 90° and preferably has a value between 10° and 30°. If the radius of the tooth apex is equal to the working radius, $\gamma F$ is nil, whatever $\alpha F$, as is the case in FIG. 3.

POSSIBLE INDUSTRIAL APPLICATIONS

The object of the invention finds a particularly advantageous application in the field of compressors or vacuum pumps.

We claim:

1. Profiles of screw-type rotors for a rotary machine conveying a gaseous fluid, machine of the type comprising a body (2) defining two cylindrical bores (3 and 4), of parallel and secent axes, and two rotors (11 and 12) of the screw-type, respectively male and female, placed inside the bores and comprising complementary helical teeth (13 and 14) successively intermeshing, through the rotation in reverse direction of the rotors, across the inersection of the bores, in such a way as to define, from a transversal induction plane, a cell (A) of variable volume which evolves axially toward a second transversal delivery plane, characterized in that said profiles make use, at least for the teeth (13) of the male rotor (11), of an apex (SM):

offset of an angle ($\gamma M$) in the direction of rotation ($f_1$), said angle ($\gamma M$) being defined by the straight line (DM) joining the center of rotation (CM) of the rotor (11) to the apex (SM) and by a straight line (DM) joining the center (CM) to the center of rotation (CF) of the female rotor (12).

a chamfer (13a) of angle ($\alpha M$) open in the direction of rotation and defined between, on the one hand, a tangent (TM) to the apex (SM), perpendicular to a straight line (DM) joining said apex to the center of rotation (CM) of the male rotor (11) and, on the other hand, a straight line (dM) tangent to the apex (SM) and perpendicular to a straight line ($D_2M$) joining said apex to the instantaneous center of rotation (CI).

2. Profile according to claim 1, characterized in that the angle ($\alpha M$) is between 1° and 36°.

3. Profile according to claim 1, characterized in that it also makes use, for each one of apices (SF) of the teeth (14) of the female rotor (12), of a chamfer (14a) of angle ($\alpha F$) ranging between 1° and 90° open in the direction of rotation.

4. Profile according to claim 3, characterized in that the apices (SF) are situated on the working diameter (DP) and in that each chamfer (14a) is materialized by a straight line (dF) forming the angle ($\alpha F$) with a tangent (TF) passing through the apex (SF) and perpendicular to a straight line (DF) joining the apex (SF) to the center of rotation (CF) of the female rotor.

5. Profile according to claim 3, characterized in that the apices (SF) are situated beyond the working diameter (DP) and are offset of a positive angle ($\gamma F$) in the direction of rotation ($f_2$).

6. Profile according to claim 3, characterized in that the apices (SF) are situated within the working diameter (DP) and are offset of a negative angle ($\gamma F$) with respect to the direction of rotation ($f_2$).

* * * * *